United States Patent [19]
Sandstrom et al.

[11] Patent Number: 6,166,140
[45] Date of Patent: Dec. 26, 2000

[54] ELASTOMER BLEND AND USE IN TIRES

[75] Inventors: Paul Harry Sandstrom, Tallmadge; Edward John Blok, Wadsworth; David John Zanzig, Uniontown; Howard Allen Colvin; Michael Leslie Senyek, both of Tallmadge, all of Ohio

[73] Assignee: The Goodyear Tire & Rubber Company, Akron, Ohio

[21] Appl. No.: 09/264,774

[22] Filed: Mar. 9, 1999

Related U.S. Application Data

[60] Provisional application No. 60/113,663, Mar. 11, 1998.
[51] Int. Cl.[7] .............................. B29D 29/00; B60C 5/00
[52] U.S. Cl. ......................... 525/197; 525/198; 525/240; 525/241; 152/450; 425/28.1; 425/340; 425/363
[58] Field of Search ................................. 525/197, 198, 525/240, 241; 152/450; 425/28.1, 340, 363

[56] References Cited

U.S. PATENT DOCUMENTS

| | | | |
|---|---|---|---|
| 3,884,993 | 5/1975 | Gros | 525/211 |
| 5,162,441 | 11/1992 | Nakata et al. | 525/194 |

*Primary Examiner*—Nathan M. Nutter
*Attorney, Agent, or Firm*—Henry C Young, Jr.

[57] ABSTRACT

High viscosity elastomers are often difficult to utilize in rubber compositions without first creating a pre-blend of the high viscosity elastomer and a rubber processing oil to reduce their overall viscosity. This invention relates to utilization of a specialized pre-blend of high viscosity and low viscosity elastomers for use in rubber compositions and to the resulting rubber composition. The use of such resulting rubber composition may be for component(s) of tires, particularly including tire treads. The specialized pre-blend of high and low viscosity elastomers is required to be created by blending individual latices or, alternatively, by blending individual polymerizates of elastomers with diverse viscosities.

8 Claims, No Drawings

ELASTOMER BLEND AND USE IN TIRES

"The benefit of co-pending prior Provisional Application Ser. No. 60/113,663 is claimed, having an effective priority filing date of Mar. 11, 1998, as having been converted to a Provisional application, without modification, from prior U.S. patent application Ser. No. 09/038,869 filed on Mar. 11, 1998, now abandoned."

FIELD

The invention relates to utilization of a specialized pre-blend of high viscosity and low viscosity elastomers in rubber compositions. It particularly relates to preparation and use of a pre-blend of high and low viscosity elastomers by blending individual latices or, alternatively, by blending individual polymerizate cements of elastomers of diverse viscosities. Use of such pre-blends is contemplated for rubber compositions as tire components, including tire tread rubber compositions.

BACKGROUND

High viscosity elastomers are often used in tire tread rubber compositions. Such elastomers have a very high Mooney (ML4) viscosity value in their unvulcanized state in a range of, for example, about 70 to about 140. Elastomers of such high viscosity are typically difficult to process for preparation of rubber compositions because it is very difficult to mix rubber compounding ingredients such as, for example, carbon black and silica reinforcing fillers, in high viscosity rubber. This problematic aspect is well known to those having skill in such art.

In order to facilitate the processing of a high Mooney viscosity for rubber compositions such as tire tread stocks, namely the mixing and extrusion of the rubber composition, it is somewhat customary to use such elastomer as a pre-blend with a rubber processing oil to reduce its Mooney (ML4) viscosity to a more processable level such as, for example, in a range of about 45 to about 55. Such technique is well known to those having skill in such art.

However, it is considered herein that such use of a rubber processing oil can be disadvantageous because such oil may be substantially saturated hydrocarbon based and, thus, not participate in the vulcanization of the rubber composition. It thereby becomes somewhat of a diluent for the rubber composition and its resulting physical properties.

Liquid elastomers have also sometimes been used for such purpose with similar difficulties where the elastomers are substantially saturated in nature.

In the description of this invention, the term "phr" where used herein, and according to conventional practice, refers to "parts of a respective material per 100 parts by weight of rubber". Usually parts and percentages, where used herein, are in terms of weight unless otherwise noted.

A latex, insofar as this invention is concerned, is normally prepared by polymerizing diene monomers, optionally also with styrene, in a water-based medium, usually as an emulsion accompanied with suitable emulsifiers, with a free radical catalyst activators (s). Often a redox polymerization system is used. Descriptions of various polymerizations may be found, for example, in U.S. Pat. No. 3,080,334; in *Synthetic Rubber* by G. S. Whitby, 1954, particularly Chapter 8 and *Emulsion Polymerization* by F. A. Bovey et al, Vol. IX of "High Polymers", Interscience Publishers, Inc., 1955. Various organic initiators are described by J. Brandrup et al, *Polymer Handbook* (John Wiley & sons), 1965, pages II-3 to II-51. The resulting latex is then coagulated to recover the elastomer. Standard coagulation techniques, such as salt-acid coagulation procedures, can be employed. For example, a styrene/butadiene copolymer elastomer can be prepared by such aqueous emulsion polymerization process. The Mooney viscosity of the resulting copolymer can be controlled to some degree by the various polymerization parameters so that such copolymer of a relatively high Mooney or of a relatively very low Mooney (ML4) value can be prepared. It is believed that such aqueous emulsion polymerization processes are well known to those having skill in such art.

By the term "polymerizate", "cement" or "polymerizate cement" where used herein, it is meant that it is the product of individually polymerizing monomers selected from at least one conjugated diene or at least one conjugated diene with an aromatic vinyl compound such as, for example, styrene and/or alpha-methylstyrene, in the presence of catalyst initiator(s) and in an organic solvent and stopping the actual polymerizing of the monomers but before the resulting polymer is removed from the polymerizate.

The terms such as "compounded rubber", "rubber compound" and "rubber composition" relate generally to "rubber which has been mixed with various rubber compounding ingredients". Such terms are well known to those skilled in the rubber mixing art, especially for tires.

The terms "vulcanized", "vulcanize", "cured" and "cure", if used herein, are used interchangeably to refer to the "vulcanization of rubber" and such terms are well known to those having a skill in the rubber vulcanization art.

The term "Tg", if used herein, refers to the "glass transition temperature of a particular elastomer". Glass transition temperatures are well known characterizations of elastomers. They may, for example, be suitably determined by a differential scanning calorimeter (DSC) instrument with a heating rate of 20° C. per minute.

The term "Mooney viscosity" where used herein, unless otherwise specified, may be referred to as an (ML4) viscosity and refers to "a viscosity of an elastomer in its uncured state, and without appreciable additives dispersed therein other than antidegradants, measured by (or according to) ASTM Test Method D1646 conducted at 100° C.". Sometimes the test is referred to as ML1+4, a shorthand for meaning Mooney Large (using the large rotor) with a one minute static warm-up before determining the viscosity after four minutes. As used herein, a ML4 viscosity measurement is intended to mean the ML1+4 viscosity measurement.

SUMMARY AND PRACTICE OF THE INVENTION

In accordance with this invention, a method of preparing an elastomer composition is provided which comprises the steps of (A) blending (1) a first latex of a diene-based elastomer having a Mooney (ML4) viscosity in a range of about 70 to about 140 with an additional latex of a diene-based elastomer having a Mooney (ML4) viscosity in a range of about 5 to about 20 or (2) a first polymerizate of a diene-based elastomer having a Mooney (ML4) viscosity in a range of about 70 to about 140 with an additional polymerizate of a diene-based elastomer having a Mooney (ML4) viscosity in a range of about 5 to about 20, followed by (B) drying and recovering the resulting elastomer blend; wherein the weight ratio of said first high viscosity elastomer to said additional low viscosity elastomer is in a range of about 20/1 to about 1/1.

The above recovered elastomer blend of this invention may be referred to herein as a pre-blend.

Significant aspects of this invention are that the said additional low viscosity elastomer is not a liquid elastomer and, further, that said high viscosity first elastomer and said low viscosity additional elastomers have spatially defined Mooney (ML4) viscosities that differ from each other by a value of at least 50.

In one aspect of the invention, it is preferred, and usually required, that the pre-blend, does not contain any appreciable amount (i.e. preferably zero, although alternatively less than ten, weight percent based on the blend) of any elastomer having a Mooney (ML4) viscosity intermediate to the said viscosity ranges of said first and additional elastomers of the blend, namely a viscosity value in a range between 20 and 70.

It is to be appreciated that the blend, or pre-blend, is required to be composed of at least about 66 weight percent of the said first, high viscosity, elastomer, insofar as the elastomer pre-blend is concerned.

It is also to be appreciated that both the first and additional elastomers are prepared by either (1) polymerization of monomers in the presence of a catalyst initiator(s) in an organic solvent to create a polymerizate thereof and that, for the purposes of this invention, it is the individual polymerizates which are blended together or by (2) providing latices of the diverse elastomers and blending them together.

The diene-based elastomers for said first and second elastomers are selected from homopolymers and copolymers of conjugated dienes such as, for example, isoprene and 1,3-butadiene and from copolymers of such diene hydrocarbons and an aromatic vinyl compound such as, for example, styrene and/or alpha-methylstyrene.

In further accordance with this invention, such an elastomer blend, or pre-blend, is provided which is exclusive of rubber processing oil or substantially exclusive thereof by containing less than about five weight percent of rubber processing oil, based on the elastomers of the blend.

In additional accordance with this invention, a method of preparing a rubber composition is provided which comprises blending in an internal rubber mixer and based on 100 phr of elastomer, (A) about 50 to about 100, or alternatively about 50 to about 90, phr of the elastomer pre-blend of this invention and (B) about zero to about 50, alternatively about 10 to about 50, phr of at least one additional elastomer having an intermediate Mooney (ML4) viscosity in a range between 20 and 70 selected from homopolymers and copolymers of conjugated dienes such as, for example, isoprene and 1,3-butadiene and from copolymers of such diene hydrocarbons and an aromatic vinyl compound such as, for example, styrene and/or alpha-methylstyrene.

In further accordance with this invention, a rubber composition is provided as the above blend of said pre-blend and additional elastomer(s).

In an additional aspect of this invention, a tire is provided having a component comprised of said blend of said pre-blend and additional elastomer(s).

In a further aspect of this invention, a tire is provided having a tread of a rubber composition comprised of said blend of said pre-blend and additional elastomer(s).

In another aspect of this invention, a tire is provided having a tread of a rubber composition comprised of, based on 100 phr of elastomers, (A) about 50 to about 100, alternatively about 50 to about 90, phr of said pre blend and about zero, alternatively about 10 to about 50, phr of at least additional one diene-based elastomer having an intermediate Mooney (ML4) viscosity in a range of about 40 to about 60, (B) about 40 to about 100, alternatively about 60 to about 90, phr of particulate reinforcing filler selected from (1) carbon black or (2) carbon black and silica, where the silica is preferably precipitated silica, with a weight ratio of carbon black to silica in a range of about 1/20 to about 20/1, alternatively about 1/5 to about 5/1; (C) at least one coupling agent, having a moiety reactive with silanol and with hydroxyl groups contained on the surface of said silica and/or carbon black as the case may be and another moiety interactive with said elastomer.

Typically, the coupling agent is used in a weight ratio of silica and/or carbon black, as the case may be, of about 7/1 to about 15/1.

For example, the coupler may be a bis 3-(trialkoxysilylalkyl) polysulfide having from 2 to about 8 sulfur atoms in its polysulfidic bridge.

Exemplary of such a bis 3-(trialkoxysilylalkyl) polysulfide coupling agent may be such an agent where said alkyl groups are selected from methyl, ethyl and propyl groups. For example, it may be a bis 3-(triethoxysilylpropyl) polysulfide having an average of about 2.1 to about 4, alternatively about 2.1 to 2.5 or alternatively about 3.5 to about 4, sulfur atoms in its polysulfidic bridge.

Significantly, the tread rubber composition is required to contain an appreciable content of elastomer(s) having a relatively high Mooney viscosity (ML4), provided by way of the pre-blend of this invention, which is normally relatively difficult to easily process in conventional rubber processing equipment absent the preparation and utilization of the pre-blend of this invention. A desirability of utilizing such high viscosity elastomer(s) in a tire tread rubber composition is, for example, to enhance abrasion resistance and treadwear performance.

Also, significantly, for the purposes of this invention, the tread rubber composition is required to contain an appreciable content of elastomer(s) having a relatively low Mooney viscosity (ML4). Such very low Mooney viscosity elastomer(s) are not liquid and are normally considered to be relatively difficult to process but for a very different reason. Such elastomers are usually rather sticky and, thus, hard to handle both outside of and inside of an internal rubber mixer such as a Banbury mixer.

Further, as hereinbefore pointed out, the pre-blend elastomer composition is required to be essentially exclusive of elastomers having a Mooney viscosity (ML4) in a range between 20 and 70. This is because it is considered herein that inclusion of such elastomer would tend to reduce, or dilute, the desirable effect of the high viscosity elastomer for enhancing an abrasion resistance property of the rubber composition and, also, tend to reduce the effect of the inclusion of the low Mooney viscosity elastomer on the overall processing (mixing and handling) of the pre-blend rubber composition. Representative of desirable elastomers in such intermediate rubber viscosity range are, for example, synthetic cis 1,4-polyisoprene rubber, various styrene/butadiene elastomers and cis 1,4-polybutadiene rubbers so long as they have the required intermediate Mooney viscosity values.

While the mechanism may not be completely understood, it is believed that it is the prescribed combination of high and low spatially defined Mooney viscosity elastomers which acts to promote the aforesaid more optimized traction and treadwear aspects of the tire tread rubber composition.

It is understood herein that it is well known to those having skill in the tire tread art to use various blends of elastomers for tire tread compositions. However, it is an important feature of this invention that specific elastomers with specified and spatially defined Mooney viscosities are used in specified amounts as a pre-blend, in a substantial, or essentially complete, absence of other elastomers with intermediate Mooney viscosities, for preparation of rubber compositions, particularly for tire treads. It is believed herein that such specified pre-blend for use in rubber tire tread rubber compositions is novel and inventive.

It is recognized that various elastomer reinforcing carbon blacks can be used in the practice of this invention for the tire tread rubber composition as would be well known to those skilled in such art. For example, relatively high reinforcing carbon blacks are contemplated such as those having an Iodine number in a range of about 80 to about 150 and a DBP (dibutylphthalate) value in a range of about 90 to about 150 as exemplified in *The Vanderbilt Rubber Handbook* (1990), page 417). For example, the N121, N220, N234, N330 and N375 carbon blacks might be contemplated.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The BET surface area of the silica, as measured using nitrogen gas, may be in a range of about 100 to about 250, preferably about 120 to about 200, square meters per gram ($m^2/g$) . The BET method of measuring surface area is described in the *Journal of the American Chemical Society*, Volume 60, page 304 (1930).

The silica also may typically have a dibutylphthalate (DBP) value in a range of about 100 to about 400, and usually about 150 to about 300 ml/100 g.

Various commercially available silicas may be considered for use in this invention such as, for example only and without limitation, silicas commercially available from PPG Industries under the Hi-Sil trademark with designations 210, 243, etc; silicas available from Rhone-Poulenc, with designation of Zeosil 1165MP, silicas available from Degussa AG with designations VN2 and VN3, and BV3370GR and from J.M. Huber as, for example, Zeopol 8745.

It is readily understood by those having skill in the art that the rubber composition of the tread rubber would be compounded by methods generally known in the rubber compounding art such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344–346. Typical amounts of antiozonants comprise about 1 to about 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.5 being sometimes preferred.

Accelerators are used to control the time and/or temperature required for vulcanization and to improve the properties of the vulcanizate. Retarders are also used to control the rate of vulcanization. In one embodiment, a single accelerator system may be used, i.e., primary accelerator. Conventionally and preferably, a primary accelerator(s) is used in total amounts ranging from about 0.5 to about 4, alternatively about 1.2 to about 2.0, phr. In another embodiment, combinations of a primary and secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to the use of the specified blend of synthetic elastomers with spatially defined relatively high Mooney viscosity and exceptionally low Mooney viscosity, preferably with practically an exclusion of elastomers with specified intermediate Mooney viscosities.

The tire can be built, shaped, molded and cured by various methods which will be readily apparent to those having skill in such art.

The invention may be better understood by reference to the following examples in which the parts and percentages are by weight unless otherwise indicated.

EXAMPLE I

In this example, a pre-blend of emulsion polymerization prepared high viscosity styrene/butadiene rubber and low viscosity emulsion polymerization prepared styrene/butadiene rubber is obtained.

The first, high viscosity, styrene/butadiene rubber (the first rubber) had a very high Mooney (ML4) viscosity of about 110.

The additional, low viscosity, styrene/butadiene rubber (the additional rubber) had a very low Mooney (ML4) viscosity of about 6. It would not be considered a semi-solid and certainly not a liquid polymer.

The first elastomer latex of styrene/butadiene rubber is prepared by copolymerizing styrene and 1,3-butadiene in the presence of an emulsion redux catalyst in a water-based polymerization system. The polymerization is stopped by shortstop addition, thereby creating the resulting latex. The latex is composed of, primarily, about 20–25 weight percent of the copolymer elastomer and about 80–75 weight percent of water, as well as a very small amount of emulsifiers and catalyst residue. Such method of preparing such latex is well known to those skilled in such art.

The additional elastomer latex of styrene/butadiene rubber is similarly prepared with similar elastomer concentration in the latex mixture with conditions being controlled to yield the low viscosity copolymer elastomer.

The first and additional latices are blended together, in various ratios, by mixing in a mixer at a temperature of about 23° C.

The first and additional styrene/butadiene rubbers (SBR's) are then recovered as a pre-blend from the blended latices by simply drying in an air oven at about 80° C. to about 100° C.

The resulting, recovered pre-blend was composed of about 55 phr of the first, high Mooney viscosity, SBR and about 45 phr of the additional, low Mooney viscosity, SBR. The pre-blend had a Mooney viscosity value of about 45.

The pre-blend is identified herein as pre-blend A.

EXAMPLE II

In this Example, rubber compositions are prepared by blending the recovered pre-blend of Example I with various elastomers. The blends for this Example included a Control, as well as experimental blends X and, which are shown in the following Table 1.

Control blends (Ctrl M and Ctrl N) are prepared, for comparison purposes, using emulsion polymerization prepared and organic solution prepared styrene/butadiene copolymer elastomers but without the elastomer pre-blend of this invention.

The rubber compositions for this Example were prepared in an internal rubber mixer using three separate stages of addition (mixing), namely, two sequential non-productive mix stages (without the sulfur and accelerator curatives) to a temperature of about 150° C. and one final productive mix stage (with sulfur and accelerator curatives) to a temperature of about 105° C.

TABLE 1

|  | M Ctrl | X | N Ctrl | Y |
|---|---|---|---|---|
| 1st Non-Productive Mix | | | | |
| SBR rubber[1] | 96.25 | 0 | 70.1 | 0 |
| Polybutadiene rubber[2] | 37.25 | 37.25 | 61.25 | 61.25 |
| Pre-Blend A[3] | 0 | 96.25 | 0 | 70.1 |
| Processing oil[4] | 10 | 10 | 10 | 10 |

TABLE 1-continued

|  | M Ctrl | X | N Ctrl | Y |
|---|---|---|---|---|
| Carbon black[5] | 70 | 70 | 70 | 70 |
| Processing aids[6] | 6 | 6 | 6 | 6 |
| Zinc oxide | 2 | 2 | 2 | 2 |
| Total oil[9] | 43.5 | 17.35 | 43.8 | 23.7 |
| Productive Mix | | | | |
| Sulfur | 1.6 | 1.6 | 1.6 | 1.6 |
| Accelerators[7] | 1.7 | 1.7 | 1.7 | 1.7 |
| Antioxidant[8] | 1.2 | 1.2 | 1.2 | 1.2 |

1) Emulsion polymerization prepared styrene/butadiene copolymer rubber containing 23.5 percent bound styrene and 37.5 phr of aromatic processing oil and a Mooney viscosity (ML4) of about 46 at 100° C. obtained as PLF1712 from The Goodyear Tire & Rubber Company;
2) Cis 1,4-polybutadiene rubber containing 25 phr of aromatic processing oil and the mixture having a Mooney viscosity (ML4) of about 50 at 100° C. obtained as BUDENE® 1254 from The Goodyear Tire & Rubber Company;
3) The elastomer pre-blend "A" from Example I;
4) Aromatic rubber processing oil;
5) N299 carbon black;
6) Waxes, peptizers, etc;
7) Sulfenamide type;
8) Phenylenediamine type;
9) Sum of parts of oil in the elastomer(s) and the additional oil added to the rubber composition.

The following Table 2 illustrates the various physical properties of the cured rubber compositions. The rubber compositions had been cured at 150° C. for about 18 minutes.

TABLE 2

| Sample | M (Ctrl) | X | N (Ctrl) | Y |
|---|---|---|---|---|
| Extrudate Appearance[1] | | | | |
| Outer Edge | 5 | 4 | 6 | 4 |
| Inner Edge | 5 | 3 | 6 | 3 |
| Surface | 5 | 3.5 | 5.5 | 3.5 |
| Rheometer Data (150° C.) | | | | |
| Max. Torque (dNm) | 32.8 | 34 | 34.5 | 35 |
| Min. Torque (dNm) | 8.1 | 8 | 9 | 8.5 |
| $T_{90}$ (min) | 11.5 | 13.5 | 11.3 | 12.3 |
| Stress-Strain | | | | |
| Tensile Strength, MPa | 16.5 | 18.3 | 15.1 | 16.8 |
| Elongation @ Break, % | 610 | 618 | 589 | 617 |
| 300% Modulus, MPa | 6.5 | 7.1 | 6.3 | 6.5 |
| Rebound | | | | |
| Rebound at 100° C. (%) | 50 | 47 | 52 | 49 |
| Hardness | | | | |
| Shore A Hardness, 100° C. | 50.6 | 51.9 | 51.6 | 52.6 |
| Abrasion Resistance | | | | |
| DIN Abrasion, volume loss (cm³) | 95 | 84 | 77 | 74 |

1. Tread die extrudate appearance where a 1 rating assigned herein is good in a sense of being as being relatively smooth and a 10 rating assigned herein is bad as being relatively rough in visual appearance.

The physical properties of the samples in this Example show that the prepared pre-blend of the high viscosity SBR and low viscosity SBR enabled the use of the high viscosity SBR (provided in the pre-blend) without resorting to using a mixture of the high viscosity SBR and rubber processing oil.

In particular, it is observed from Table 2 that the DIN abrasion volume loss where the pre-blends X and Y are used is appreciably reduced when compared to the controls M and N, respectively. This is considered herein to be a desirable predictive property for wear resistance for tire tread rubber compositions.

Further, appearance of the extrudates from the tread die shows that the rubber compositions utilizing the pre-blend (experiments X and Y) processed considerably better than the Control rubber compositions M and N in that their extruded surfaces were noticeably smoother.

Tensile strength values of Exp's X and Y, as compared to their respective Controls, (M) and (N), are appreciably higher which is indicative of improved durability for a tire tread.

Modulus and hardness values of Exp's X and Y are up, as compared to their Controls, (M) and (N), which is indicative of improved tire handling for a tire tread.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a tire which comprises first forming a pre-blend of two diene-based elastomers, blending said pre-blend with at least one additional diene-based elastomer having a Mooney (ML4) viscosity in a range between 20 and 70, shaping the resulting rubber composition into a suitable tread stock, building the tread stock onto an uncured tire rubber carcass and vulcanizing the tread/carcass assembly in a suitable mold under conditions of elevated temperature and pressure; wherein said pre-blend of elastomers is prepared by (A) blending
   (1) a first latex of a diene-based elastomer having a Mooney (ML4) viscosity in a range of about 70 to about 140 with an additional latex of a diene-based elastomer having a Mooney (ML4) viscosity in a range of about 5 to about 20, or
   (2) a first polymerizate of a diene-based elastomer having a Mooney (ML4) viscosity in a range of about 70 to about 140 with an additional polymerizate of a diene-based elastomer having a Mooney (ML4) viscosity in a range of about 5 to about 20, followed by (B) drying and recovering the resulting elastomer blend; wherein the weight ratio of said first high viscosity elastomer to said additional low viscosity elastomer is in a range of about 20/1 to about 1/1.

2. The method of claim 1 wherein said elastomer composition is prepared by blending a first and additional aqueous emulsion polymerization prepared latex.

3. The method of claim 1 wherein said elastomer composition is prepared by blending a first and additional organic solution polymerization prepared polymerizate.

4. The method of claim 1 wherein said first and additional elastomers have spatially defined Mooney (ML4) viscosities that differ from each other by a value of at least 50.

5. The method of claim 2 wherein said first and additional elastomers have spatially defined Mooney (ML4) viscosities that differ from each other by a value of at least 50.

6. The method of claim 3 wherein said first and additional elastomers have spatially defined Mooney (ML4) viscosities that differ from each other by a value of at least 50.

7. The method of claim 5 wherein said first and additional latices are styrene/butadiene copolymer latices.

8. The method of claim 6 wherein said first and additional polymerizates are styrene/butadiene copolymer polymerizates.

* * * * *